US009037529B2

(12) United States Patent
Monroe et al.

(10) Patent No.: US 9,037,529 B2
(45) **Date of Patent: *May 19, 2015**

(54) METHOD FOR GENERATING VISUAL MAPPING OF KNOWLEDGE INFORMATION FROM PARSING OF TEXT INPUTS FOR SUBJECTS AND PREDICATES

(71) Applicant: Ceresis, LLC, Honolulu, HI (US)

(72) Inventors: Terrence Monroe, Honolulu, HI (US); James Kennedy, Murrieta, CA (US)

(73) Assignee: Ceresis, LLC, Honolulu, HI (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/787,700

(22) Filed: Mar. 6, 2013

(65) Prior Publication Data

US 2013/0183649 A1 Jul. 18, 2013

Related U.S. Application Data

(63) Continuation-in-part of application No. 13/272,656, filed on Oct. 13, 2011, now Pat. No. 8,407,165, which is a continuation-in-part of application No. 13/161,451, filed on Jun. 15, 2011, now abandoned.

(51) Int. Cl.

| | |
|---|---|
| ***G06F 17/00*** | (2006.01) |
| ***G06N 7/00*** | (2006.01) |
| ***G06N 7/08*** | (2006.01) |
| ***G06F 17/24*** | (2006.01) |
| ***G09B 5/00*** | (2006.01) |
| ***G06F 17/27*** | (2006.01) |
| ***G06F 17/30*** | (2006.01) |

(52) U.S. Cl.

CPC *G06F 17/24* (2013.01); *G09B 5/00* (2013.01); *G06F 17/2785* (2013.01); *G06F 17/30731* (2013.01); *G06F 17/30719* (2013.01)

(58) Field of Classification Search

CPC ....... G06F 17/30831; G06N 7/00; G06N 7/08
USPC .......................................................... 706/56
See application file for complete search history.

(56) References Cited

U.S. PATENT DOCUMENTS

| | | | | |
|---|---|---|---|---|
| 7,165,023 | B2 | 1/2007 | Corman | |
| 2003/0167266 | A1 | 9/2003 | Saldanha | |
| 2007/0011134 | A1 | 1/2007 | Langseth | |
| 2009/0157801 | A1 | 6/2009 | Barber | |
| 2009/0164912 | A1* | 6/2009 | Barber et al. | 715/751 |
| 2010/0070891 | A1* | 3/2010 | Creekbaum et al. | 715/763 |
| 2010/0122151 | A1* | 5/2010 | Mendelson et al. | 715/209 |

OTHER PUBLICATIONS

MindManager, Version 9 for Windows, 2010, User Guide: Index, pp. 1, 5-6, 9, 21, 24, 29.

* cited by examiner

*Primary Examiner* — Kakali Chaki
*Assistant Examiner* — Peter Coughlan
(74) *Attorney, Agent, or Firm* — Leighton K. Chong

(57) ABSTRACT

A method for performing relational analysis of parsed input is employed to create a visual map of knowledge information. A title, header or subject line for an input item of information is parsed into syntactical components of at least a subject component and any predicate component(s) relationally linked as topic and subtopics. A search of topics and subtopics is carried out for each parsed component. If a match is found, then the parsed component is taken as a chosen topic/subtopic label. If no match is found, then the parsed component is formatted as a new entry in the knowledge map. A translation function for translating topics and subtopics from an original language into one or more target languages is enabled by user request or indicated user preference for display on a generated visual map of knowledge information.

14 Claims, 17 Drawing Sheets

METHOD FOR GENERATING VISUAL MAPPING OF KNOWLEDGE INFORMATION FROM PARSING OF TEXT INPUTS FOR SUBJECTS AND PREDICATES

The present U.S. patent application is a continuation-in-part of co-pending U.S. patent application Ser. No. 13/272,656 filed on Oct. 13, 2011, which was a continuation-in-part of U.S. patent application Ser. No. 13/161,451 filed on Jun. 15, 2011.

TECHNICAL FIELD

This invention generally relates to visual mapping of knowledge information, and particularly to performing relational analysis of parsed input for visual mapping of knowledge information.

BACKGROUND

Knowledge created by human effort, research, and synthesis is constantly increasing. When people interact by communicating and exchanging information, the information shared between them will increase exponentially. With the vast and ongoing explosion of information within organizations of people of every kind, the task of capturing and sharing knowledge within an organization from volumes of shared information becomes increasingly difficult.

The field of knowledge management has been developed to develop frameworks for knowledge capture and sharing, and to employ strategies for managing knowledge processes within organizations. Explicit knowledge represents knowledge that is captured in a form that can easily be communicated to others. The creation or synthesis of "new knowledge" is continually being added to "established knowledge" captured and shared within a group, organization, or community. One strategy to managing knowledge encourages individuals to explicitly encode their knowledge into a shared knowledge repository, such as a knowledge database, so that they and others can retrieve knowledge provided to the repository. An important tool for encoding knowledge into and retrieving knowledge from a knowledge repository is knowledge mapping in which a visual representation (map) of knowledge objects in a repository is created so that users within a group, organization, or community can visually assess the contents of the repository and access desired content readily and quickly.

One example of a knowledge mapping system is the MindManager™ visual information mapping software offered by MindJet, Inc., having worldwide corporate headquarters located in San Francisco, Calif. The MindManager™ software enables a user to create, add to, and use a knowledge map created for a given theme or subject. A knowledge map is created and expanded by entering labels for topics, subtopics, sub-subtopics, etc., each of which represents a container (file, folder, or repository object) for storing information content related to that label. The relatedness of each topical label to one or more other topical labels is also defined, resulting in a tree or network structure that can be added to, expanded, modified, and re-organized in an intuitive manner using visual click-and-drop tools. Other trees or networks of knowledge containers can be linked and managed in a similar manner. The knowledge mapping is intended to bring visual order to ideas and information by displaying all related topical objects on a requested subject into a single interactive view. A wide range of types of information content, attachments, notes, links, etc., can be stored in a container and viewed using an integrated viewer. Knowledge content can then be visually accessed, acted upon, and/or exported to other applications.

However, presently available knowledge mapping tools lack a convenient way to quickly or even automatically define a topic to be added and/or its relationship to other topics in a knowledge tree or network. They further lack a convenient way to quickly or automatically add information content to an already defined topic and/or its links to other information content in that or other topics in the knowledge tree or network.

SUMMARY OF INVENTION

In accordance with a preferred embodiment of the present invention, a method for relational analysis of an input item of information having a title, header or subject line and content to which it refers, said method to be performed on a computer system operating a visual knowledge mapping software program for creating a visual map of input information items related to a given theme and to each other as topics and subtopics in order to create a visual map of knowledge information of the given theme, and said computer system having a storage repository for storing information content of topic and subtopics referenced on the visual map of knowledge information, said method comprising:

Parsing a title, header, or subject line for an input item of information into syntactical components of at least a subject component and any predicate component syntactically related thereto;

Determining the subject component as a topic and any predicate component as a subtopic relationally linked thereto;

Searching an index of any existing knowledge information map and any existing topics and subtopics created therein for a match to said subject component syntactically parsed from the input item of information;

If a match to an existing topic is found, then formatting said subject component to be the same as the existing topic, and if no match is found, then formatting said subject component as a new topic in the existing knowledge information map, and Storing any topic-related information content of the input item of information in the storage repository of the computer system referenced to the formatted topic on the visual map of knowledge information, Whereby input items of information can be quickly and conveniently added to the knowledge information map created and maintained on the computer system.

In the preferred embodiment, further steps of the method may be carried out for any predicate component by:

Searching the index of the existing knowledge information map and existing subtopics created therein for a match to said predicate component syntactically parsed from the input item of information;

If a match to an existing subtopic is found, then formatting said predicate component to be the same as the existing subtopic, and if no match is found, then formatting said predicate component as a new subtopic in the existing knowledge information map; and Storing any subtopic-related information content of the input item of information in the storage repository of the computer system referenced to the formatted subtopic on the visual map of knowledge information.

In a preferred modification to the method of the present invention, a translation function of the computer system for translating topics and subtopics from an original language into one or more target languages is enabled by user request or indicated user preference for display on a generated visual map of knowledge information.

The parsed input can include both metadata and non-metadata entries. If metadata is parsed, a recursion algorithm of the parsing subsystem reduces the associated non-metadata parsed input entry into a subject component and a predicate component, if a predicate component exists for that entry. A metadata tag may override standard parsing rules and result in either non-parsing or specific parsing of an entry.

When the parsing of input is completed, the matching subsystem acts on the parsed input. If there is metadata instruction for matching, that metadata is executed first. For example, there might be metadata indicating that matching shall be bypassed and data directly stored with links specified in the metadata. If there is no metadata concerning matching, the parsed input is then compared to stored data entries. Search algorithms are used to determine whether non-metadata input should be linked to other data entries, subsumed under other data entries, rejected as duplicate data, established as original data, or processed in some other manner.

A particularly useful application for the method of the present invention is for creating knowledge maps of educational subjects for teaching. Knowledge maps for History, for example, can be formatted according to region (Asia, America, Europe, etc.), chronological order (ancient times to present day), thematically (women's movement, organized labor, occupations of conquered lands, etc.). From a "master map" for the History theme of instruction, a student learner can access individual knowledge maps, for example, for the history of philosophy, the history of art, the history of law, the history of science and technology, or the history of medicine.

Other objects, features, and advantages of the various embodiments of the present invention will be explained in the following detailed description with reference to the appended drawings.

BRIEF DESCRIPTION OF DRAWINGS

FIG. 9 is a schematic diagram of a preferred embodiment of Scan-to-Map system, in greater detail of which

DETAILED DESCRIPTION

Figure 1:
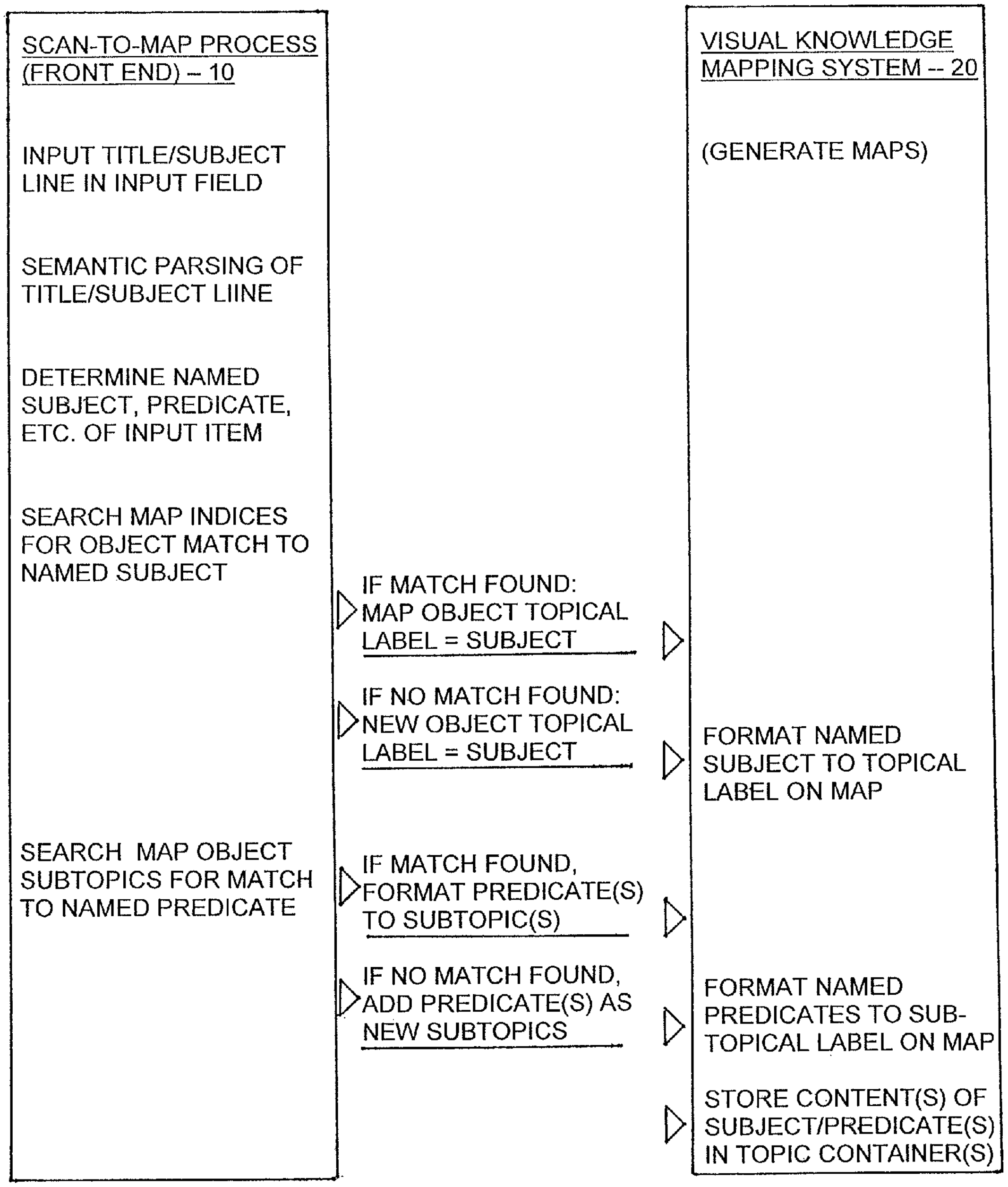
FIG. 1 is a flow diagram illustrating an overall architecture for relational analysis of semantically parsed input for visual mapping of knowledge information in accordance with a preferred embodiment of the present invention.

In the following detailed description, certain preferred embodiments are described as illustrations of the invention in a specific application, network, or computer environment in order to provide a thorough understanding of the present invention. Those methods, procedures, components, or functions which are commonly known to persons of ordinary skill in the field of the invention are not described in detail as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system, which may be one of any type having suitable computing resources. Aspects of the present invention are also discussed with respect to an Internet system including electronic devices and servers coupled together within the Internet platform, but it may be similarly implemented on any other type of extended network system including wireless data or digital phone networks. Although a variety of different computer systems can be used with the present invention, an exemplary computer system is shown and described in a preferred embodiment of the present invention system.

In the preferred embodiment, a relational analysis of new items of information is performed to determine their relationships to existing topics and/or items of information content already captured in a visual knowledge map. A commercially available knowledge mapping tool is used to create and maintain a visual knowledge map. An example of a preferred knowledge mapping system for use in the present invention system is the MindManager™ visual information mapping software offered by MindJet, Inc., in San Francisco, Calif. (as described previously).

The present system is predicated on the premise that all knowledge is in some way interconnected. As such, it operates by performing a relational analysis of an input item of information to determine its topical definition and relationships to existing items of information already mapped into a knowledge repository. In general, each input item of information will have a title, header or subject line and information content to which it refers. The relational analysis process is initiated by executing a parsing of the title, header or subject line. The title, header or subject line is scanned and broken down into one or more syntactical components of at least a subject and perhaps one or more predicates. The syntactical components are then analyzed to determine their relationships to existing topics and subtopics already captured in the knowledge map. If the input item is a new topic relevant to the knowledge map, then a new topical label is added to the knowledge map and any topic-related information content is stored in the repository indexed by that topical label. If the input item is identified with an existing topic already in the knowledge map, then it is formatted the same as the matching topical label and any information content is added to the repository referenced by that topical label. A similar process can be carried out for formatting any predicate(s) syntactically parsed from the input item of information. The complete process of parsing of input, relational analysis of syntactical components, and addition to knowledge map is referred to herein as the "Scan-to-Map" process.

Referring to FIG. 1, a preferred embodiment for the Scan-to-Map method in the present invention is illustrated showing its performing of relational analysis of parsed input items of information to a visual map of knowledge information. The Scan-to-Map process 10 is configured as an input front end to a Visual Knowledge Mapping System 20. The Scan-to-Map process first scans the text of the title, header or subject line of an input item of information. The text sentence or phrase is broken down into subject(s), predicate(s), and other syntactical components. The syntactical functions of the parsed components are then determined. Their syntactical functions determine the type of object that it will be formatted as in the knowledge map. A "subject" syntactically parsed from the title sentence or phrase will be defined as a "parent" knowledge object, typically a topic on the knowledge map. One or more predicates in the syntax of the title sentence or phrase will be defined as "offspring" knowledge objects, typically subtopics on the knowledge map. The formatting of "parent" and "offspring" objects is then carried into the knowledge map.

In natural language processing systems, human languages are parsed by parser programs of varying levels of semantic depth and complexity. Human sentences are not easily parsed by computer programs, as there is substantial ambiguity in the structure of human language. Some parsing systems use lexical functional grammar, while others may use a more complex "head-driven phrase structure" grammar. Shallow parsing programs aim to find only the boundaries of major constituents such as noun phrases. Another popular strategy for avoiding linguistic complexity is dependency grammar parsing. Most modern parsers are at least partly statistical, that is, they rely on a corpus of training data which has already been annotated (parsed manually). This approach allows the system to gather information about the frequency with which various semantic constructions occur in specific contexts. A widely used application for semantic parsers of relatively low complexity is as a spelling and grammar checker for word processing programs. For example, commercially available, semantic parser programs for word processing in English and other languages are offered by Babylon.com, based in San Francisco, Calif.

The parser generator deconstructs a sentence or phrase of scanned text and identifies its syntactical elements. Phrase-structure rules can be used to break down a natural language sentence or phrase into constituent parts. The parser generator program can associate executable code with each of these grammatical rules, sometimes referred to as "semantic action routines". These routines may construct a parse tree (or abstract syntax tree), or generate executable code directly. The resulting elements in a parse tree can be converted to knowledge map schema utilizing a markup tag (such as in XML tagging). The tagged elements can then be associated with analogous parent/offspring knowledge objects in the knowledge map. These knowledge objects are then associated with other objects in the knowledge map in a relational format that reflects their semantic levels of function. An example of relational links that may be used to reflect semantic level of function are those corresponding to semantic functions of "Why", "How", "So", "Meaning", "Analogy", and "Concept". The relational links may be determined by relational rules automatically or ascertained through human analysis to be incorporated manually.

For formatting in a knowledge map, the parsed objects may be associated with existing knowledge objects in a relational schema, using relational links labeled "Why" (to explicate a knowledge object's reasons); "How" (to explicate a knowledge object that represents a process); and "So" (to explicate a knowledge object's effect, result, or outcome). The program determines whether a sentence element has such a relationship (as a "Why", "How", or "So" offspring) according to grammatical rules as to a) the order in which the sentence element appears; b) the structure in which it occurs; c) the type of meaning it expresses; d) the type of affixes it takes; e) Boolean predicates that the content must satisfy; f) data types governing the content of elements and attributes, and g) more specialized rules such as uniqueness and referential integrity constraints.

The relational formatting process also uses relational links labeled "Meaning" (to explicate the significance of a knowledge object) and "Analogy" (to establish a relationship of a knowledge object to an analogous knowledge object elsewhere—useful in comparing comparable events in history). These relationships are ascertained through human analysis, and are incorporated into the knowledge map manually. New input is mapped either by creating a new knowledge map for a subject or by incorporating it into an existing map.

The relational link "Concept" is used to establish a social, cultural, religious, political, economic, behavioral or other concept that relates to a topic in the map to which it is appended, and to comparable topics in other maps.

The program searches for the named subject in an index of existing knowledge objects. If a match is found for the named subject, the program determines what the various secondary predicates in the scanned text are and correspondingly appends these secondary objects to the pre-existing map as offspring objects. If no match is found, the program would regard the new input as a new subject, and create a new knowledge map for that subject.

The parsed elements can be automatically formatted into an existing knowledge map by checking them against existing indices maintained in a system, in the following order:

1. Root directory of knowledge maps, with links to listed subsidiary maps.
2. Specific knowledge map with name of subject, with links to listed topics
3. Specific topics with name of subject, with links to listed subtopics
4. Specific subtopics with name of subject, with links to listed sub-subtopics
5. Etc., to lowest level of relational hierarchy in specific knowledge map If no existing knowledge object is found in the system indices matching the named subject, the formatting procedure can automatically format the named subject by determining its relational link to an existing object in the knowledge map. The automatic formatting can be performed by finding the object at the highest level of relational hierarchy for which the named subject matches that object's semantic function of "Why", "How", "So", "Meaning", "Analogy", and "Concept", and incorporating the named subject as a subtopic to that object. Alternatively, the named subject can be manually defined as the label for a topic in the appropriate knowledge map, and its relational links to existing objects can also be manually defined. In a similar manner, the named predicates and sub-predicates to the named subject can be quickly or even automatically defined relationally with respect to existing subtopics of the determined topical object.

If the input item of information has a header of multiple sentences, such as an abstract for an article as information content, then a corpus-based parsing strategy may be used. For example, a "subject" may be identified from a keyword appearing most frequently in the text, and any predicates can be identified from predicate syntactical components referenced by the identified subject keyword.

While the primary purpose of the invention method is to enable the parsing, relational analysis, and formatting of input items of information to be done automatically for speed, efficiency, and convenience, the option for manual intervention of an expert in the subject theme for knowledge map creation may also be included.

Conceptual or semantic mapping, which explicates the significance of meaning and relationship among knowledge objects, may be performed manually, using the specialized expertise of a map creator in the subject who comprehends the significance of various aspects of that subject and of their inter-relationships and relationships to other subjects.

Using the Scan-to-Map process, input items of information can be quickly or automatically added and properly formatted into a knowledge map maintained by the system. Input items of information from a wide range of sources can thus be conveniently added to a knowledge map, such as links to relevant webpages, email text and/or attachments, links from annotated text, articles, blogs, etc. The Scan-to-Map process would enable such new items to be quickly or automatically added to a knowledge map simply by clicking and dropping the URL address, email header, or annotated link into the input field for the knowledge map.

Figure 2:
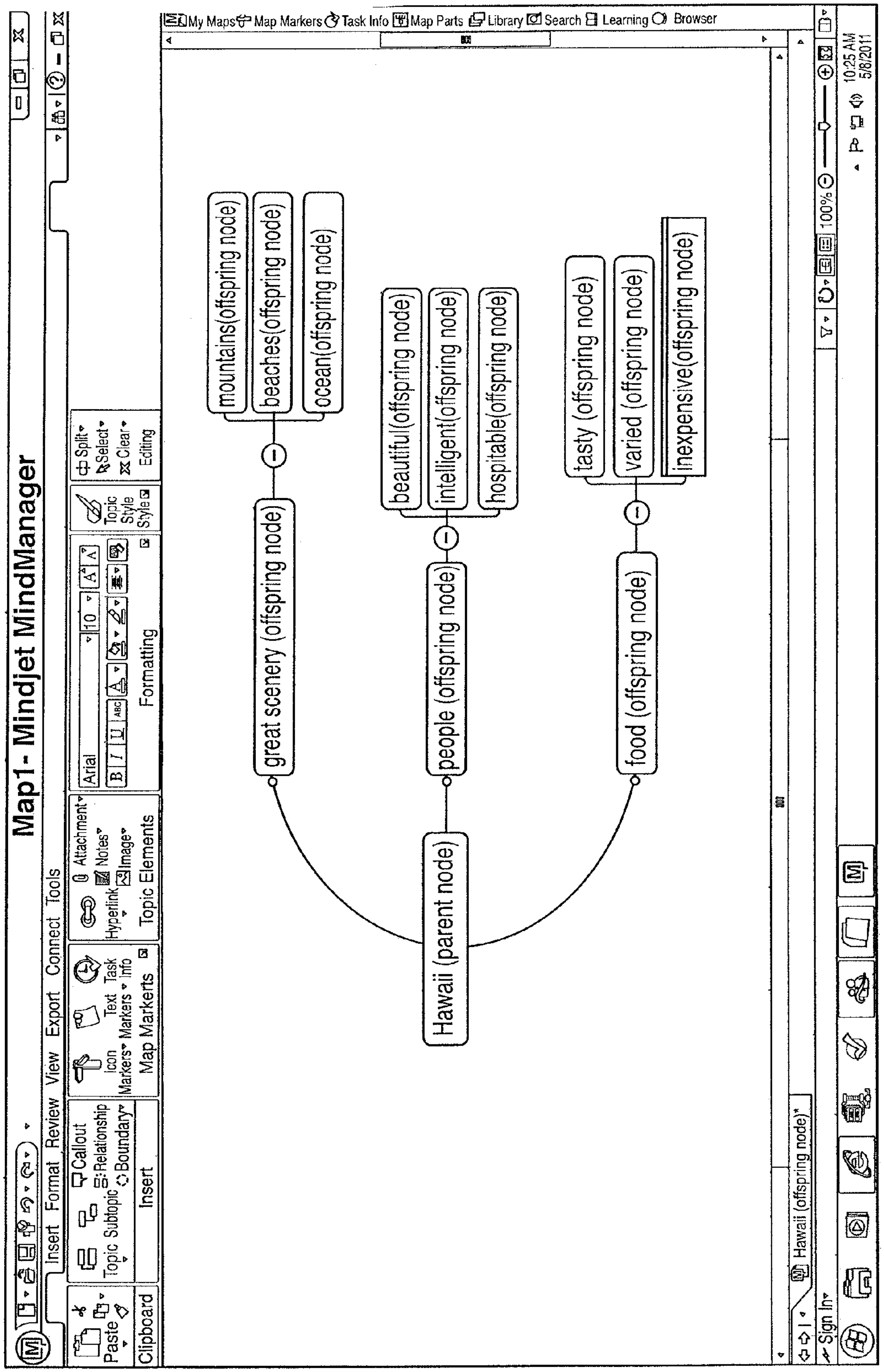
FIG. 2 illustrates an example of the Scan-to-Map process for scanning an input item of information and formatting its semantic elements into a new knowledge map.

FIG. 2 illustrates an example of the Scan-to-Map process for scanning an input item of information and formatting its semantic elements into a new knowledge map. In this example, the title or subject line sentence is scanned as text: "Hawaii has great scenery of mountains, beaches, and ocean, people who are beautiful, intelligent, and hospitable, and food that is tasty, varied, and inexpensive." Once this sentence is scanned, it is broken down into its subject, i.e., "Hawaii", predicates, i.e., "great scenery, people, food", and corresponding sub-predicates, and relationally formatted into the knowledge map as parent and offspring (and further offspring) nodes.

The formatting of predicates as subtopics can also be carried out automatically. Consider the input sentence, "Hawaii has good weather, friendly people, and tasty food." The system can parse the input sentence in the Scan-to-Map function and identify a predicate ("good weather"). A search of the topic indices reveals that under the subject "Hawaii" there is no subtopic "good weather." The system will then format the predicate "good weather" to be a sub-topic of "Hawaii" and creates an entry in the map for this new sub-topic/predicate, and links this entry to the parent "Hawaii" entry as an offspring object. All of the sub-predicates that relate to "good weather" (e.g., "blue skies", "warm temperatures", and "fluffy white clouds") may similarly be considered sub-topics.

Every predicate becomes an identified syntactical object when a sentence is broken down. Whether it is stored as content of a parent object or formatted separately as an offspring object depends on how much material it presents. For example, when a topic presents more information than can be viewed as an extension on the map or otherwise viewed without scrolling, the Scan-to-Map function can create new sub-topic offspring objects that are linked to the parent object.

The Scan-to-Map program can determine whether to assign material to an existing topic on a higher level—or set it up as a new map—by the context of the information scanned. For example, if a scanned article is determined (by the preponderance of subject words) to be concerned primarily with the subject "Hawaii", then a sub-topic "good weather" can be assumed to relate to the parent heading "Hawaii" rather than to another parent, say, "Florida." If no topical match to "Hawaii" is found, the subject can be considered to be a new parent object, distinct from all other parent subjects, and is placed in the index in alphabetical order of parent subjects.

Figure 3:
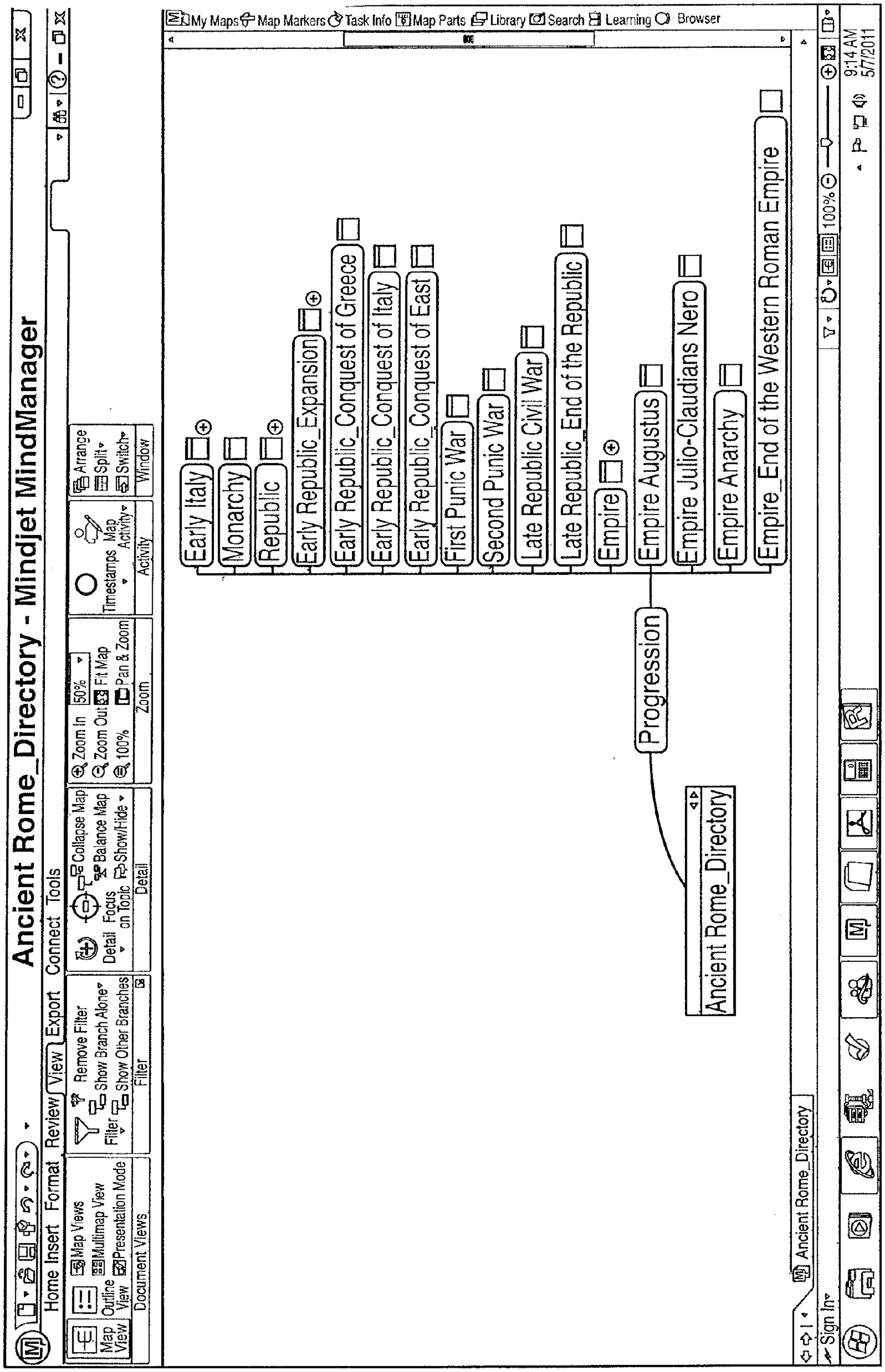
FIG. 3 illustrates searching a root directory of knowledge maps for a match to a scanned subject of the input item of information.

FIG. 3 illustrates searching a root directory of knowledge maps for a match to a scanned subject of the input item of information.

Figure 4:
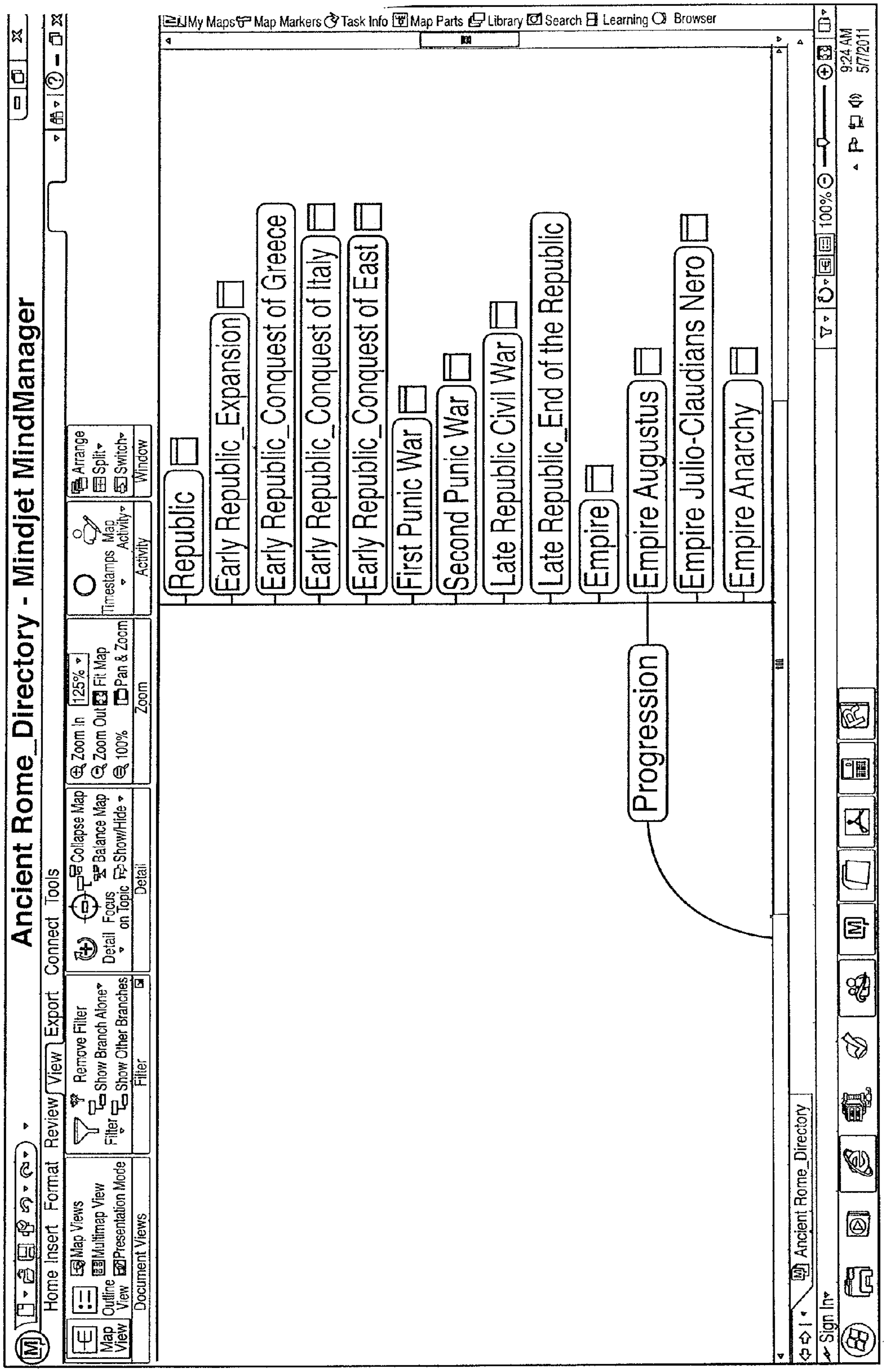
FIG. 4 illustrates a close-up of the root directory of knowledge maps in FIG. 3.

FIG. 4 illustrates a close-up of the root directory of knowledge maps in FIG. 3.

Figure 5:
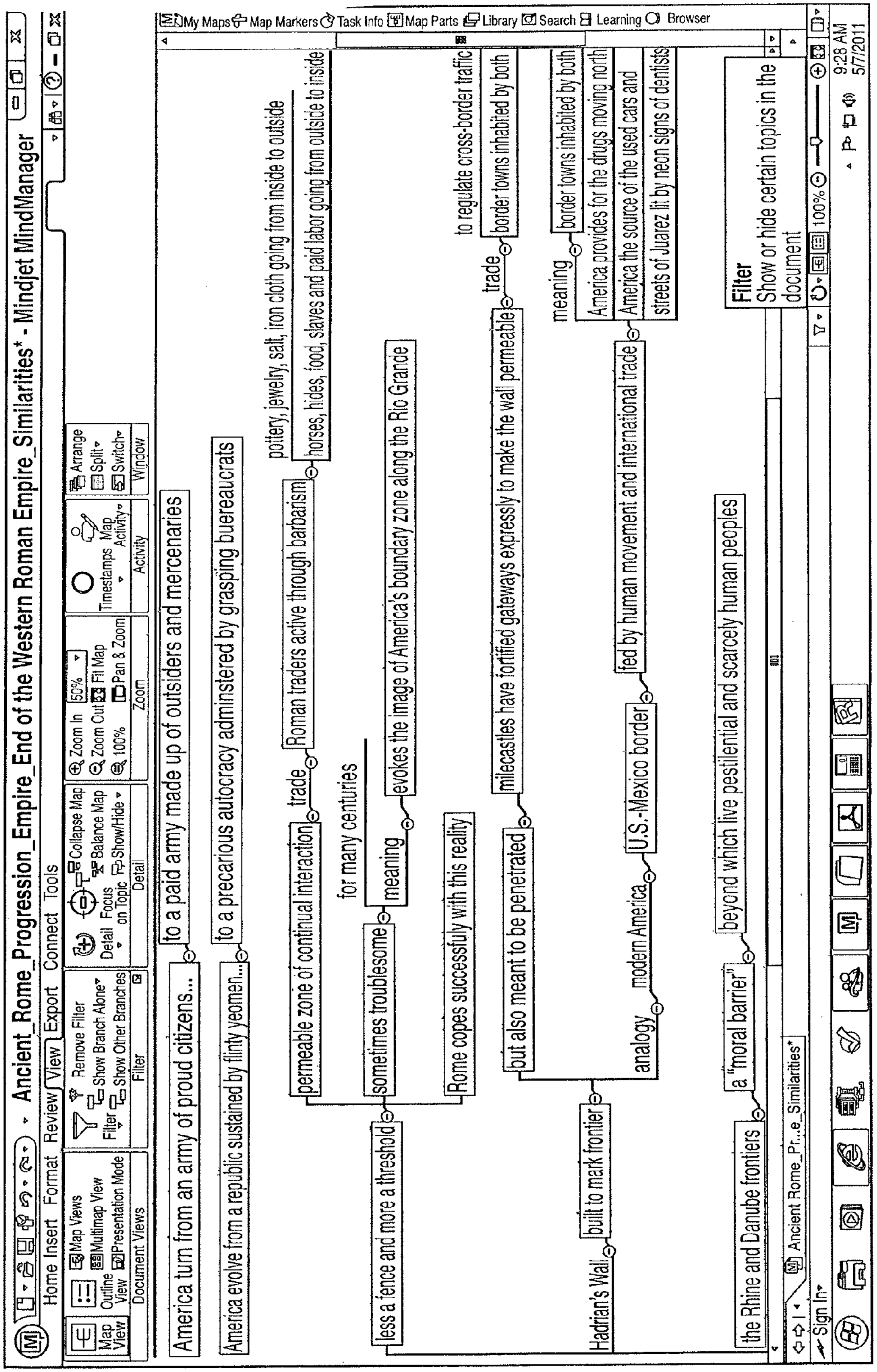
FIG. 5 illustrates expansion of a knowledge map showing various aspects of relational schema ("Why", "How", "So", "Meaning", "Analogy", and "Concept").

FIG. 5 illustrates expansion of a knowledge map showing various aspects of relational schema ("Why", "How", "So", "Meaning", "Analogy", and "Concept").

Figure 6:
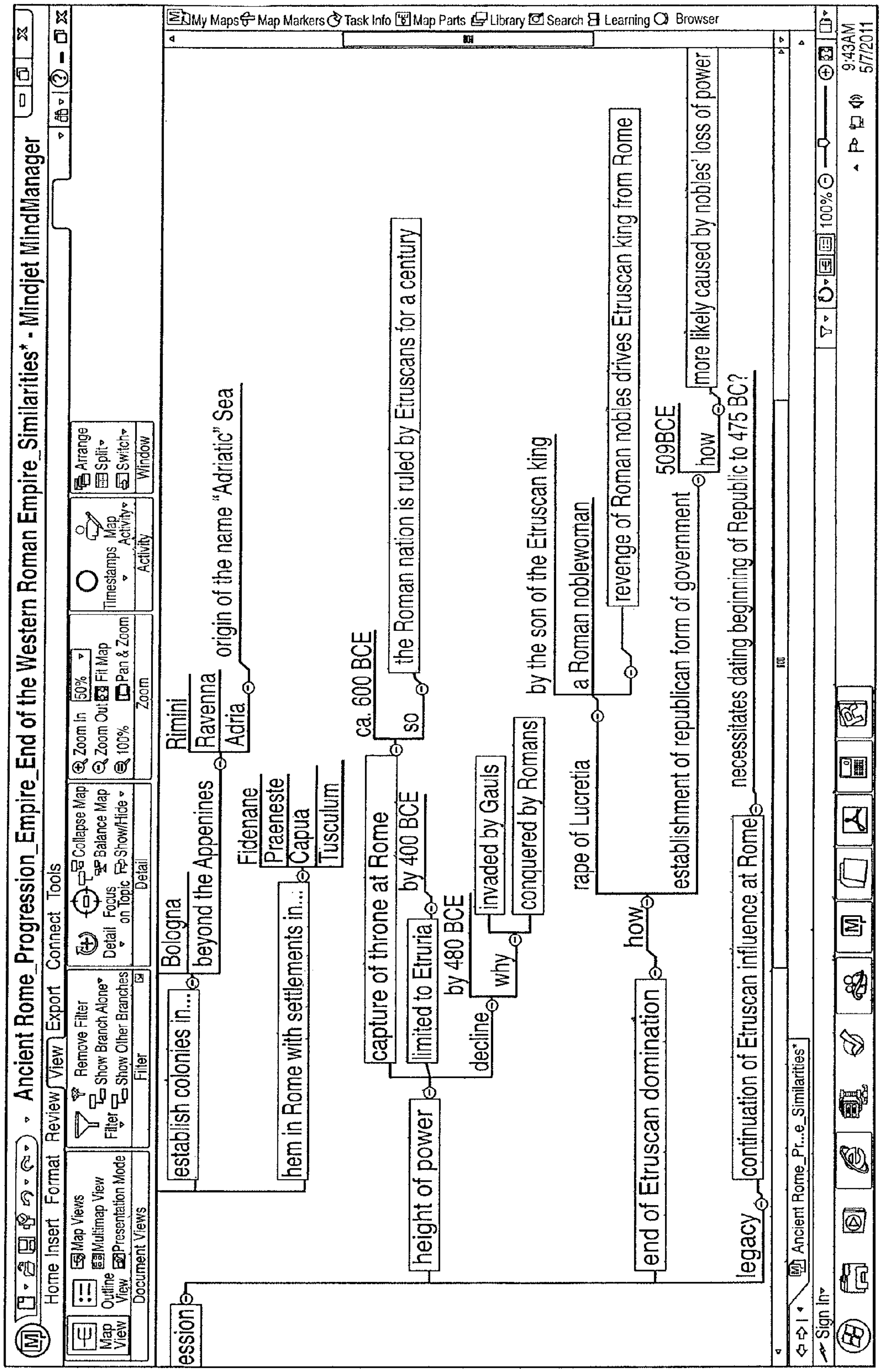
FIG. 6 illustrates another portion of the expanded knowledge map in FIG. 5.

FIG. 6 illustrates another portion of the expanded knowledge map in FIG. 5.

Figure 7:
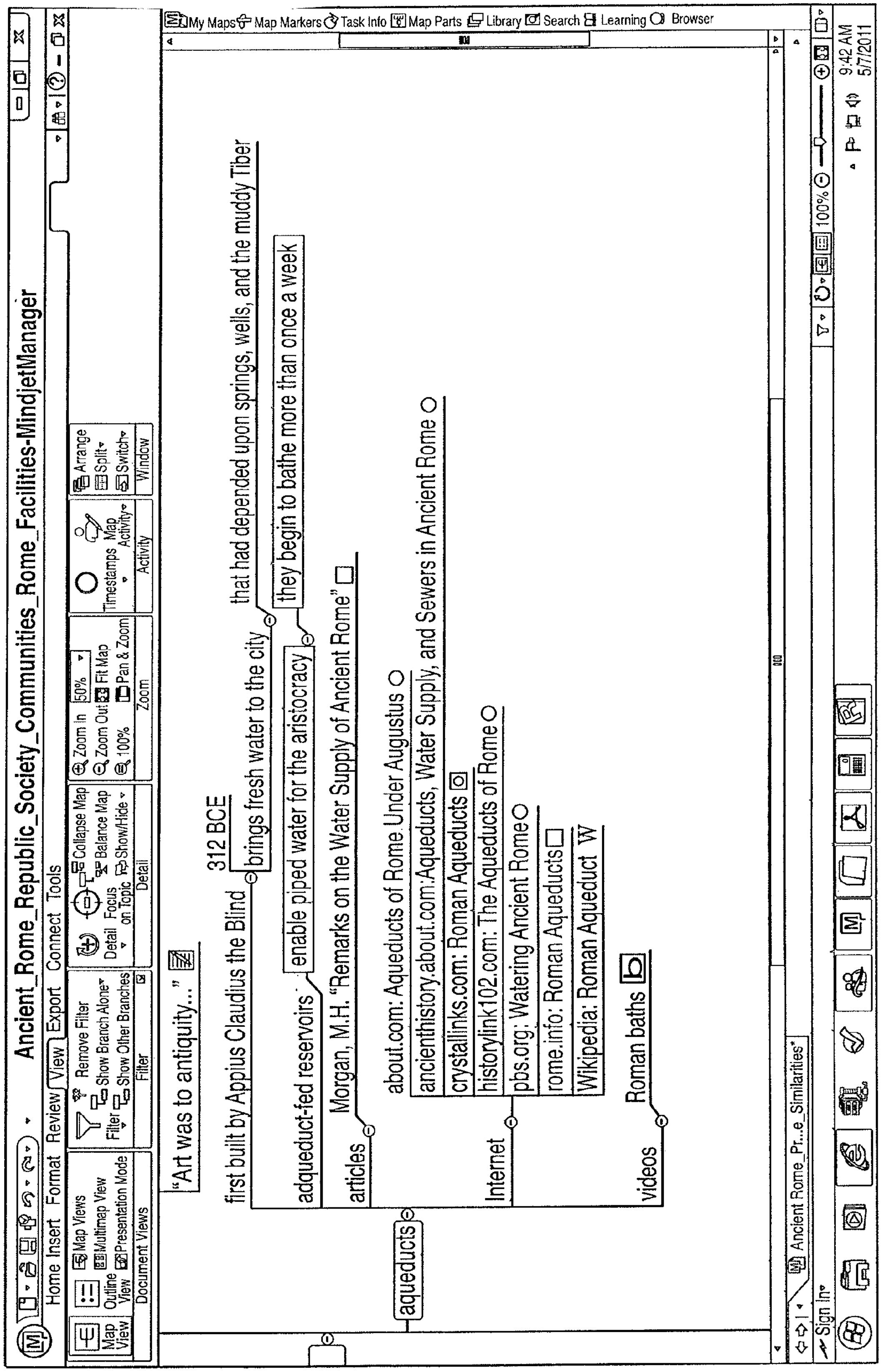
FIG. 7 illustrates a portion of an expanded knowledge map showing links to multimedia websites, image galleries, videos, articles, etc.

FIG. 7 illustrates a portion of an expanded knowledge map showing links to multimedia websites, image galleries, videos, articles, etc.

A particularly useful application for the method of the present invention is for creating knowledge maps of educational subjects for teaching. Knowledge maps for History, for example, can be formatted according to region (Asia, America, Europe, etc.), chronological order (ancient times to present day), thematically (women's movement, organized labor, occupations of conquered lands, etc.). From a "master map" for the History theme of instruction, a student learner can access individual knowledge maps, for example, for the history of philosophy, the history of art, the history of law, the history of science and technology, or the history of medicine.

The knowledge-mapped instructional system can be used to deliver an entire curriculum of arts and sciences, law, and business courses, so that the learner can acquire in this fashion nearly all subjects taught in high school, college, graduate school, vocational school, corporate and government training programs, and elsewhere.

Once developed, the knowledge maps may be used in different ways. They can be used to analyze a subject on a stand-alone basis, or as a medium for instruction in a particular discipline. This can be done by aggregating and organizing a particular subject's maps in an ordered course of instruction. An online instructional environment in which this takes place is a "course management system" that can include:

a) Lessons sections which contain respective knowledge maps for instruction;

b) Discussion/analysis workspaces related to the knowledge maps;

c) Features sections such as: an Announcements forum; a Course Calendar; a Collaboration workspace with a Virtual Classroom and Live Chat facility; a Course Roster, and more;

d) Mail section for email among users;

e) Course Information section that includes a course syllabus, system instructions, help files, and links to Technical Support;

f) Comprehensive Assessment Profile (CAP) to generate and maintain records of assessment scores and overall learner progress in a course, number of academic areas, or overall transcript.

Refinements to the instructional system can include the embedding or integration of a map of a given subject (philosophy, for example) in another, broader map (history, perhaps). In this case, the philosophy map can be highlighted in a distinctive color as it displays in the context of the broader history map that it is embedded in. This provides the learner with a context that, in this case, explicates the development of philosophy as it occurs in the historical process. This enables the user to understand a subject from different perspectives, and to understand how the subject's knowledge objects relate to knowledge objects in other subjects.

The knowledge-mapped instructional system can incorporate extensive multimedia into its formatting. Many of the knowledge objects in a map may be links to websites, bibliographies, articles and books, primary sources, films and videos, symphonies and other audio files, interactive maps, museum exhibits, lectures, and more. They can also link to discussion/analysis forums, chat rooms, assessment tools, and indexes that are keyed to specific topics in the map.

The Comprehensive Assessment Profile (CAP) is an important part of the knowledge-mapped instructional system. The assessments are coordinated with the maps used for instruction and used to objectively measure the learner's progress and provide a next-generation report card. The assessments can be embedded in the knowledge maps at appropriate points in the learner's progression through the curriculum of maps, so as to provide a measure of the learner's progress through specific aspects of the subject. The CAP can record percentile scores associated with assessment on specific aspects of a course. In this way, the CAP can provide insight into specific areas of a learner's strength and weakness in various topical areas and for an overall course. The CAP can provide component and aggregate scores, rather than assigning a traditional letter grade to the overall course of instruction. This removes the subjective factors in grading (such as teacher favoritism and student pressure on the instructor) that result in grade inflation and loss of credibility of the credential.

Figure 8:
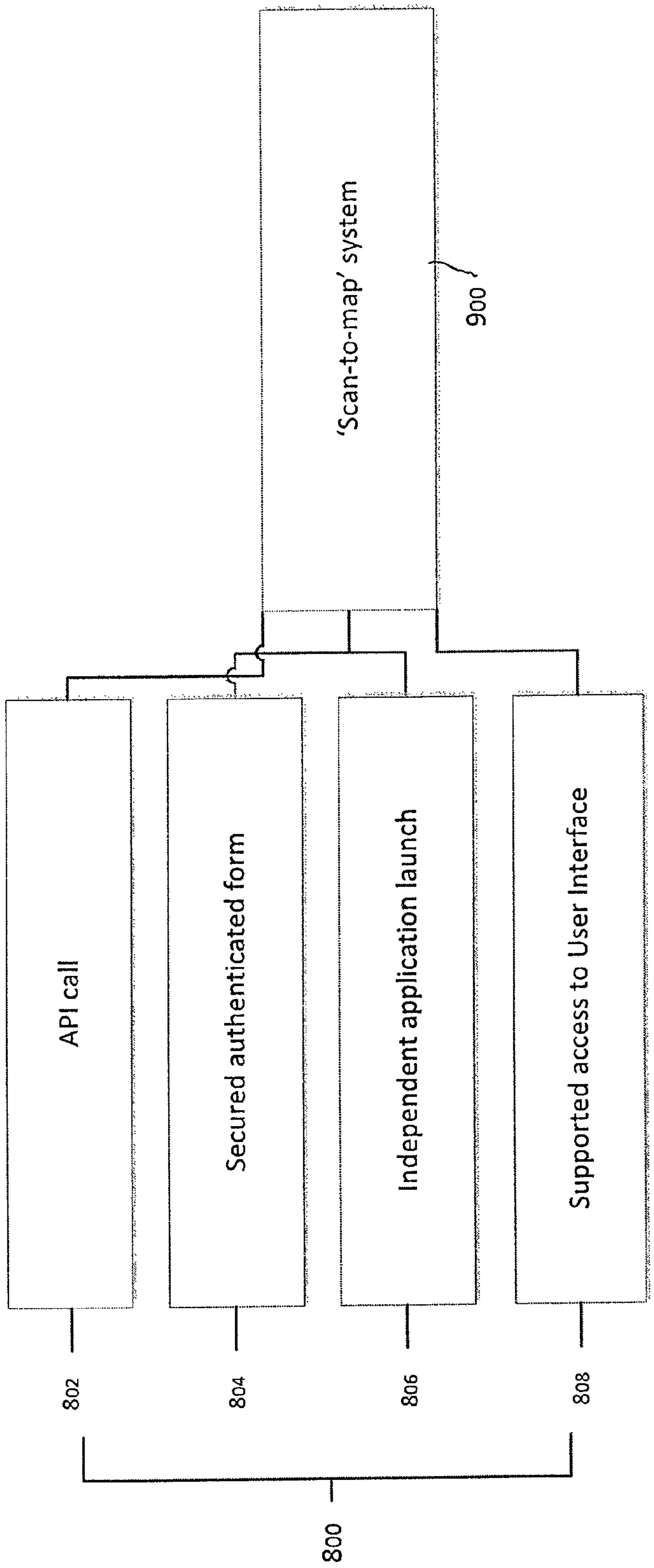
FIG. 8 is a block diagram showing input channels to the Scan-to-Map system.

A detailed description of one implementation example for the Scan-to-map system will now be provided. FIG. 8 shows a flowchart of a process 800 for the methods of providing input into the Scan-to-map system through channels that include the invocation of an API call 802, authentication into a secure form entry 804, launching of an independent application 806, or any other supported access to the user interface 808 of the Scan-to-map system.

In one aspect of the present invention, an independent process is launched which connects to and invokes an API call to the Scan-to-map system. Any agreed upon method of invocation is acceptable in the process, whether SOAP, WSDL, Web Method, Messaging subsystem, or otherwise. In a second aspect of the present invention, a secure entry form may be made available for the input of information into the system. In a third aspect of the present invention, an independent application may be launched, such application which provides direct access to the system. A fourth aspect of the present invention supports allowing access through any type of supported user interface, which includes, but is not limited to, a browser, a mobile phone distributed application or any other similar type of user interface for which the system supports access.

In a preferred embodiment, the input of information may also include metadata that provides information for the system that may be used to map new information properly into a new or existing knowledge map.

Figure 9:
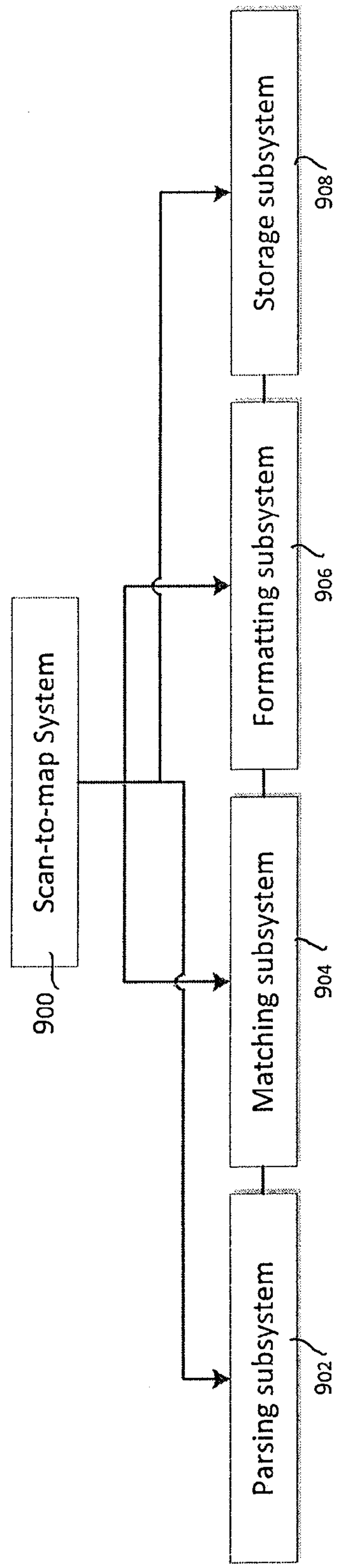

FIG. 9 is a schematic diagram of a preferred embodiment of a Scan-to-Map system 900 for parsing text input and producing a connection between new information or the incorporation of existing information into a knowledge map. The initial parsing subsystem 902 includes a metadata analysis coupled with a parsing subsystem for determining a title, header or subject line and the splitting of the input into a subject component and any predicate component syntactically related thereto. After the parsing and analysis of input, a matching subsystem 904 takes the parsed input and determines whether there are any existing links to which the input should be appended. A formatting subsystem 906 then produces both metadata and formatted data for inclusion within a new or existing knowledge map. The formatted data is then stored by a storage subsystem 908 for later retrieval.

In closer detail, the parsing subsystem 902 includes two central components. First, through every aspect detailed in process 800, there is the possibility of the inclusion of both metadata and non-metadata. Metadata may include, but is not limited to, attributes within an XML framework, XML nodes, or any type of data that is identified as metadata. For example, in one embodiment of this subsystem, a form may include supported fields which designate metadata, such as a checkbox that indicates whether input text is metadata, or ActionScript that includes a visual tag that indicates metadata may be entered. Any underlying language is supported as long as such language provides a visual method of discerning how to add metadata. An API call 802, as described in FIG. 8, may include specific calls that relate to metadata.

Once metadata is parsed, if the metadata is tied to any of a number of set responses, it will determine how new non-metadata parsed input is treated. Non-metadata input can basically map to one of three options. The first option is for a complete linking of the non-metadata to any eligible sets of existing non-metadata entries. The second option is for selective linking with specified limitations. The third option is for exclusion from linking altogether.

Second, the parsing subsystem includes all other data that is not metadata. If information is not otherwise specified, it will be treated by the parsing subsystem as non-metadata. Non-metadata is parsed using a recursive algorithm that begins with an entire entry. Entries are determined depending upon the method of input. For any method of input, there is a delimiter used to separate non-metadata from other non-metadata or metadata. The recursion algorithm reduces an entry, commonly a title, header or subject line, into a subject component and a predicate component, if a predicate component exists for that entry.

Figure 9A:
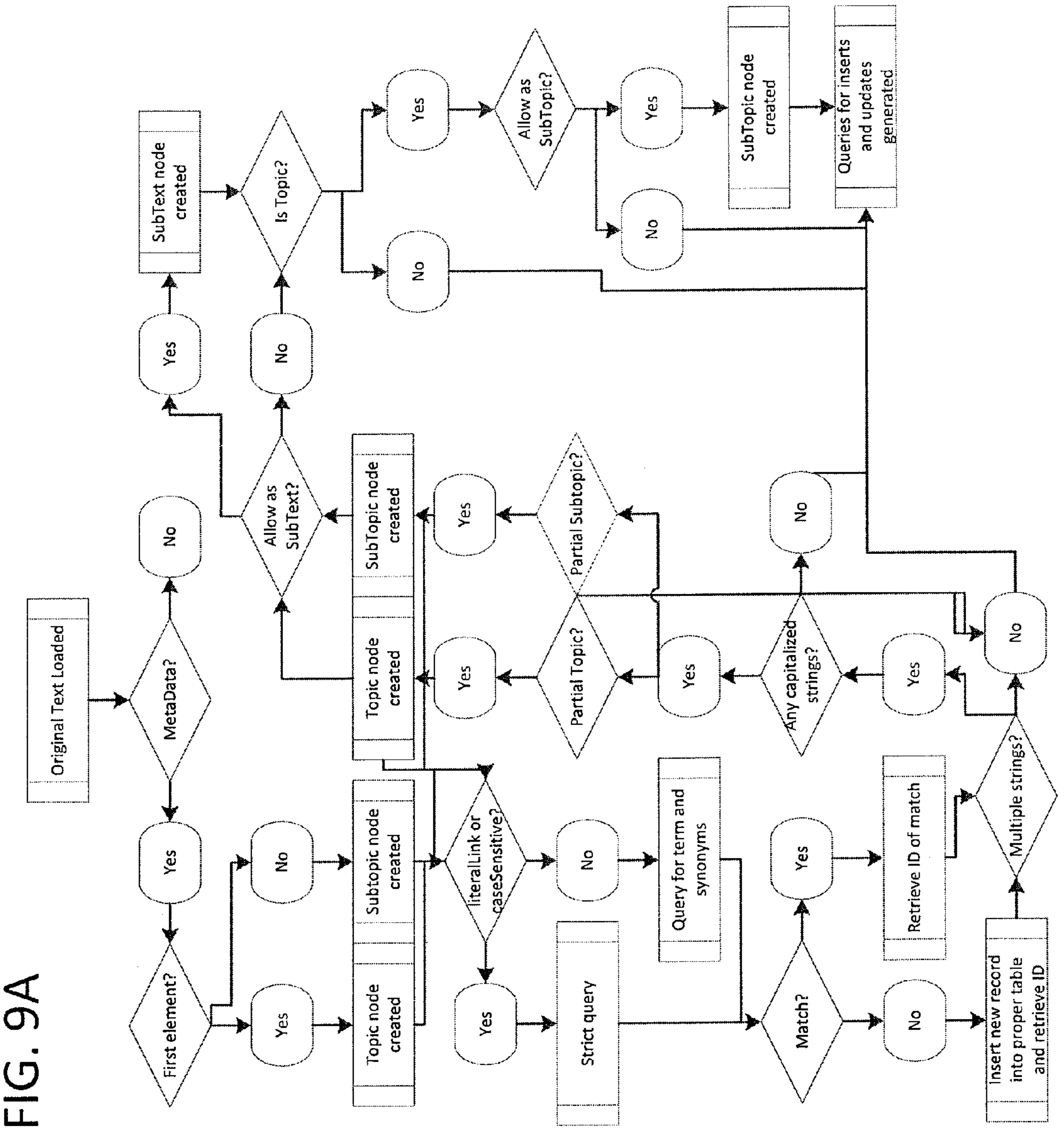
FIG. 9A shows the full logical flow present in the four underlying subsystems of the Scan-to-Map system, including the parsing subsystem shown in FIG. 9B, matching subsystem shown in FIG. 9C, formatting subsystem shown in FIG. 9D and storage subsystem shown in FIG. 9E.
Figure 9B:
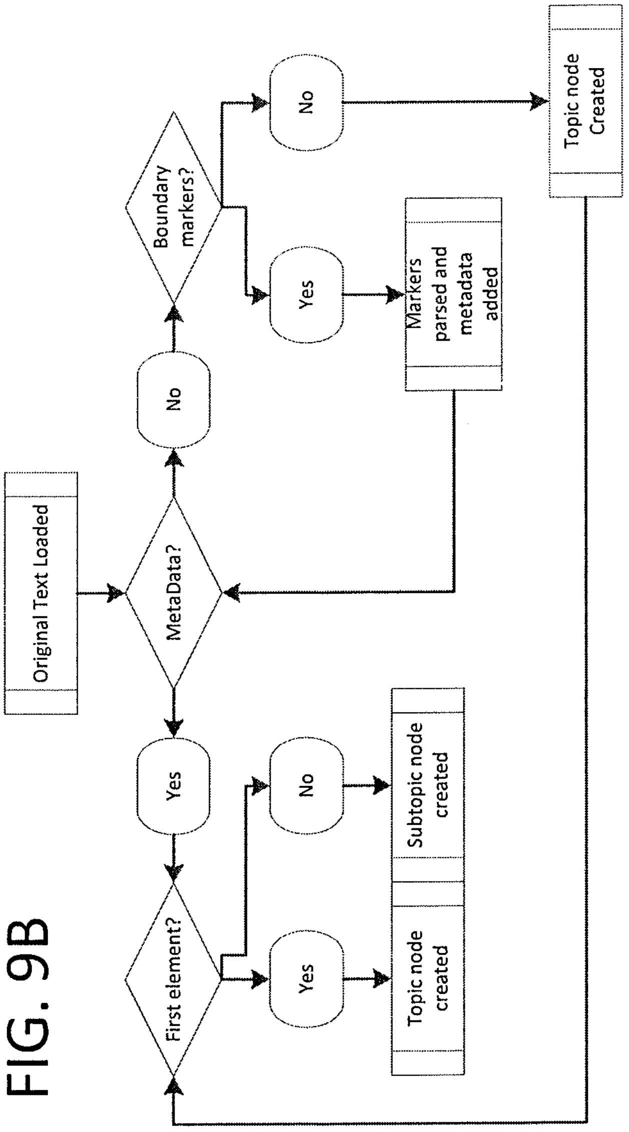

The parsing algorithm may adopt multiple variations, as long as such algorithm is calculated to parse out an entry into its atomic parts, the smallest subject and predicate parts available as part of the entry. A metadata tag may override standard parsing rules and result in either non-parsing or specific parsing of an entry. Original text loaded as the result of one of the supported methods in FIG. 8 is processed logically as shown in FIG. 9A, which shows the full logical flow present in the four underlying steps of parsing in FIG. 9B, matching shown in FIG. 9C, formatting shown in FIG. 9D and storage shown in FIG. 9E.

Any text is checked first for metadata. If metadata is found, the metadata is read and both topics and subtopics created. If no metadata is found, then the text is checked for boundary markers. A boundary marker is a standard grammatical element, such as a participial phrase. Without metadata, markers are simple and rely on a few grammatical rules. The sentence "Rome was conquered" would be parsed as "Rome" and "was conquered" by the combination of the verb "was" and the use of "ed" in the subsequent word. In many cases, there will be no grammatical rules applicable, in which case the entire text would be treated as a topic node as shown in 9B.

The matching subsystem 904 acts upon the parsed input. Once the parsing subsystem 902 has completed parsing input, the matching subsystem acts in the following manner. In all aspects, parsed data may include metadata with instructions for matching, metadata unrelated to matching, and non-metadata that has been parsed. For non-metadata that has been parsed, if there is metadata instructions for matching, that metadata is executed first. For example, there might be metadata indicating that matching shall be bypassed and data directly stored with links specified in the metadata.

Figure 9C:
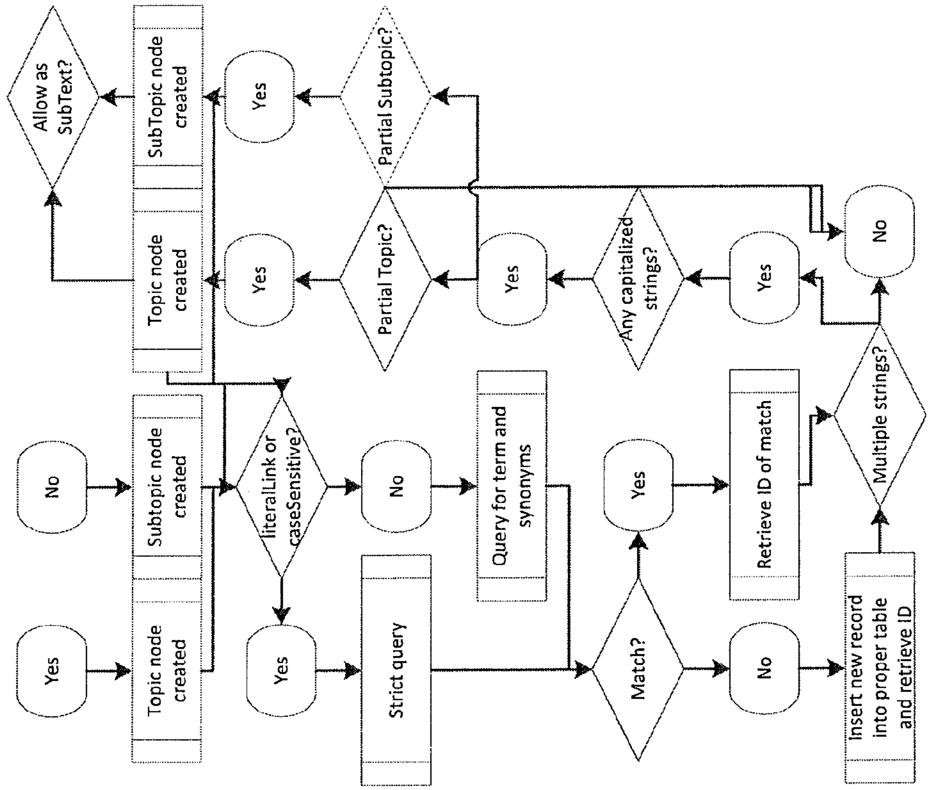

If there is no metadata concerning matching, the parsed input is then compared to already stored data entries. Search algorithms will apply matching rules to determine whether non-metadata input should be linked to other data entries, subsumed under other data, rejected as duplicate data, established as original data, or processed in some other manner as specified by the matching algorithm 904. FIG. 9C is a visual of the logical flow of the matching subsystem. The parsing system makes an initial division of text elements. If there is a match of a subject component at a Topic level, then it is subsumed under the existing topic and its predicate component may be added as a linked subtopic if no subtopic match is found. A new subject component may be added to the database as a Topic if its associated predicate component matches an existing subTopic at a lower-level. If a match is found of a subject component to an existing subTopic, then the associated predicate component may be added as linked subtext. If no metadata is present, a default rule will exclude the addition of new links unless they match strictly.

The matching algorithm is based on an application of ontological principles derived from the method of Internet search pioneered by firms like Google. In the originating phase of Internet search, firms like Yahoo! applied traditional ontological principles to the presentation of web site data. Much like the Library of Congress, Yahoo! attempted to make categories that could help simplify the display of search results. As each book was added, the Library of Congress could only assign one designation to the book. A book, therefore, nonfiction and on the Soviet Union, would have a Dewey Decimal assignment based on "Soviet Union". If there were substantial content related to the Ukraine, it would not have a secondary assignment.

Yahoo! improved upon the Library of Congress taxonomy by providing additional category possibilities for information. So a site on the Soviet Union, offering music for download and historical data, might fall in the Country category, the Music category and the History category. Yahoo! had the ability to add on new categories and ultimately could produce literally thousands of relationships upon which a user could click to explore the World Wide Web.

Providing hard categories is inelastic, in that the resulting process is a series of links that are determined by a person or committee that attempts in some way to enforce rules of structure on sites. But often in the search area users may behave in random ways. For example, in a search for the history of the Soviet Union, potential search terms are "Soviet Union", "Soviet history", "USSR", "USSR history", "Russian communism history", "Bolshevik history", "Lenin Trotsky Stalin timeline", "perestroika", etc. For any of these searches, the target may be common but the relative likelihood of a specific search may vary.

Figure 10:
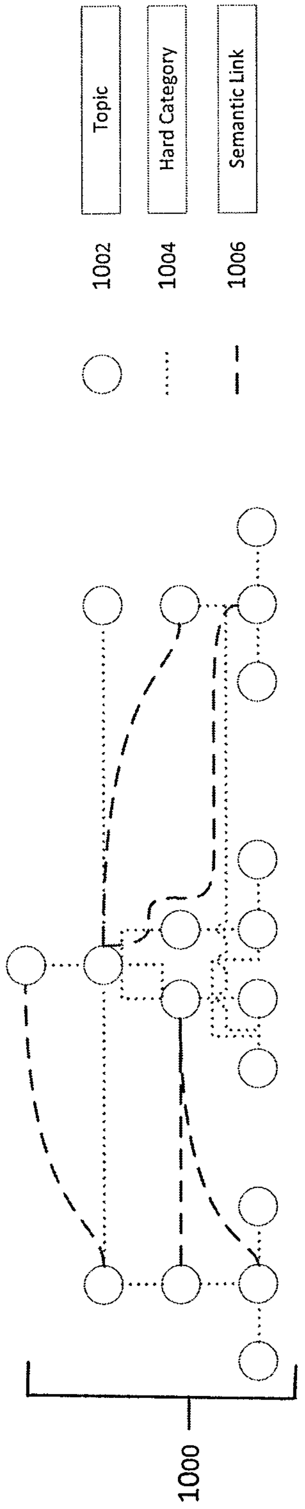
FIG. 10 is a schematic diagram of both traditional and non-traditional search ontologies.

FIG. 10 is a schematic diagram of both traditional and non-traditional search ontologies. Topics 1002 may involve a hard set of categories 1004. Semantic links 1006 do not obey any type of structured hierarchy. There are relative probabilities, ranging from zero to one, of whether a semantic link can or should be formed between topics. In a standard search, the relative links are determined through a combination of meta tags and internal calculations, returning certain results first, regardless of how common the search terms are used. As each new search term is used, and each link loaded, the result algorithm is altered to reindex the results for future retrieval.

In a preferred embodiment of the present invention, a comparison algorithm will run that factors in metadata first. The metadata overrides, if present, any further comparison. If the metadata does not override the comparison, an algorithm will run that compares the topic and topic structure with all database topics. The comparison algorithm, after processing, will determine either that the topic is within one or more hierarchies, in which case it will be linked to as many hierarchies as there are matches, and statistics stored that indicate the link volume and the hierarchical locations. If there is no link, then a new topic will be started. In this way, the hierarchies are freeform and can support as many hierarchies as there are potential topics, although in practice there will be far fewer links either through metadata restriction or comparison algorithm processing.

All objects within a parsed chain have as part of their initial parsing a designation gleaned from metadata or, in the absence of metadata, default behavior. The default behavior of any object is for it to become a top-level item in its own right. Then the object will have one or more levels representing its hierarchy. Each level is compared to the contents of the database. For exact or high-probability matches, the new object will inherit all of the original objects links in a recursive manner. The system will rely in several instances on the metadata delineating behavior of the matching algorithm.

Once the object is compared to the contents of the database, it is then updated and now if visually added will include relevant links to other potential chains. This comes, though, in a later step. The key is the flexibility of the system both automatically to match and also to allow metadata to modify matching criteria. For example, there could be an object with the topic of "Yugoslavia", a subtopic "Art" and a predicate "Much art was destroyed during the independence movement of the early 1990's". Within the database, Yugoslavia would have links to all descendant nations. Art would likely link to a high number of variations and then the notes would not be linked elsewhere as they rely on the topic and/or subtopic to provide appropriate context. Metadata in this match would include designations that would constrain future linking, thus reducing the odds of a bad link. Links may always be manually edited and/or removed, but that would then be a manual process, unlike the automated process of creating links.

In the Appendix, a set of XML documents is shown illustrating four example mappings of XML from an original scan and resulting in a parsed and matched set of documents ready for database entry, with the database schema included.

Example 1 shows an initial parsing of the scanned in text of "Ancient Rome—aspects—frontiers and provinces—high\-water mark of expansion—Trajan breaks with Augustus\' policy of defensive imperialism—conquests—Mesopotamia, Dacia (Romania), Sinai". The original text is captured in all cases as a tag called "original", as shown. The next step is the automatic generation of a tag "scanToMapFragment" with an attribute of "metaData" set to "yes" or "no".

The examples of scans with metadata are shown in Examples 1 and 4, and those without are shown in Examples 2 and 3. An original set of text may have delimiters, as shown in Examples 1 and 2, or not, as shown in Examples 3 and 4. In Example 1, the original text does have delimiters, in the example a hyphen.

All text where metadata is included is parsed into one of two nodes: "topic" and "subTopic". A "topic" may have up to six different attributes. The attributes determine whether and how the data will be inserted into the database tables. The topic in with the title "Ancient Rome" has the value "no" for "allowAsSubTopic". This means that the text will only be inserted into the Topics table and not in any other table for the original text. Further, the "literalLink" has a "no" value, which means that the database query will first look for similar topics, such as "Old Rome", "Early Rome", etc. A decision tree provides a detailed breakdown of process and steps based on different values for the various potential nodes, assuming that metadata is present.

First, the complete text is divided into the first element and subsequent elements. The first element is defined as the first string. The first element is added to a "topic" node. All other elements are added to a "subtopic" node. Then the first element is checked both for alphabetic case as well as whether to link literally to other values. In the strictest case, the term "ancient Rome", for example, would not match "Ancient Rome" or "Old Rome". If there is a match, then the first returned result is provided as the "topic" ID from the database. Otherwise, a new "topic" ID is added into the database and its ID is returned.

Next, all subsequent strings are checked for Proper Nouns (uppercase). If the metadata allows for partial topic or partial subtopic extraction, Proper Nouns are then added as their own "topic" node with the same process of determining whether they are new or an update. If the metadata supports allowing a "topic" or "subtopic" as "subtext", then new "subtext" nodes are created. For any "topics" now present, if they allow "subtopics", then "subtopic" nodes are also created.

Figure 11:
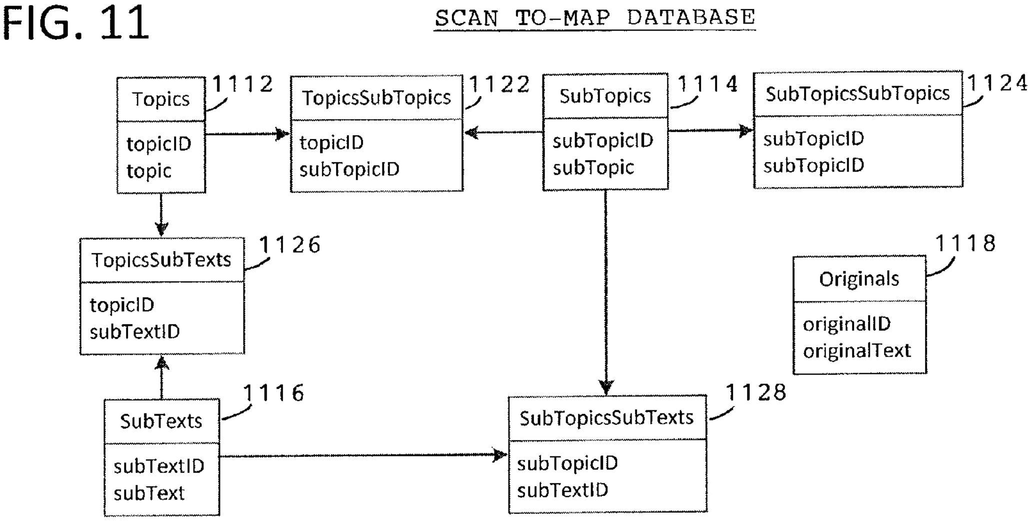
FIG. 11 shows an example of a storage database for the Scan-to-Map system.

FIG. 11 illustrates components of a Scan-To-Map Database. As shown, there are eight core tables in the Database that are updated as input is processed. Four are tables for storing pure node data, such as "Topics" 1112, "SubTopics" 1114, "SubTexts" 1116, and "Originals" 1118. The original text is stored to allow for future processing or manual intervention in certain cases. There are also four linking tables "TopicsSubTopics" 1122, "SubTopicsSubTopics" 1124, "TopicsSubTexts" 1126, and "SubTopicsSubTexts" 1128. The linking tables support many-to-many relationships among different node types. "SubTopics" may link to "Topics", "SubText", and also to themselves. Several "SubTopics" can be chained together. "SubText" is the final node in many chains, and therefore cannot be linked to other "SubTexts". "Topics" are the start of a chain and therefore may not link to other "Topics". The metadata choices determine whether to allow new and different combinations of information to other information.

Once the nodes and choices have been generated, then the various tables are updated. In the example, there would be several new entries in the linking tables so that if a user types in "Ancient Rome", there would be at least one set of results that, if clicked on, would eventually lead to the full chain as shown in the original text. In the Appendix, Example 1 demonstrates the effective use of metadata. Example 2 generates a scan-to-map where only non-metadata are provided. In that case, default business rules determine parsing. Instead of multiple "Topic" and "subTopic" nodes, there are a number of "title" nodes that carry the parsed text from the original string. Once the text fits a standard rule around grammar, which is that prepositions indicate a phrase, then "subText" nodes are added. Then, all capitalized strings are added as "Topic" nodes. Finally, the database is updated with all relevant items inserted or used to update any table matching their node description, and the linking chain is then added through linking tables so that if "Ancient Rome" is clicked on, it opens up the remaining elements of the chain.

An original string with no delimiters can still have metadata. In that case, the string is treated as though it was the sole string in the document and then broken down by metadata rules. For example, since the "Topic" node allows for "allowAsSubText", the string "Trajan disagrees with Augustus" would be added to the SubText table. Otherwise, the process is the same as in the metadata example.

An example of no delimiters and no metadata would be the most difficult to analyze. In this case, the text would be treated as a single string. In this case, default parsing rules would result in the XML shown. In other words, the "title" and "subText" nodes only appear in examples lacking metadata. The database is updated based on the combination of attributes and nodes generated from the text, and the text is stored for later review. As the database builds, the various potential combinations are increased. So, for example, if "Ancient Rome" is entered in two examples, then both chains become available for viewing by loading "Ancient Rome".

This is an example set of metadata that provides purely parsing support. The metadata may be programmatically enhanced to provide further refined processing capability. Once matching is complete, the formatting subsystem 906 is used to further prepare input for storage or other processing. In operation, as matched data becomes ready, the formatting subsystem then processes all metadata applicable to matching coupled with all matched non-metadata. Metadata that applied to formatting may include instructions related to format. For example, a metadata tag may indicate that a subject line of "Hawaii" is applicable to a specific context only, such as "Pearl Harbor", and orphaned from other links. In this sense, in one aspect the metadata may include an attribute labeled "limited_context=Pearl Harbor" or some other metadata that pertains to how the data will be handled in any subsequent matching operations.

Figure 9D:
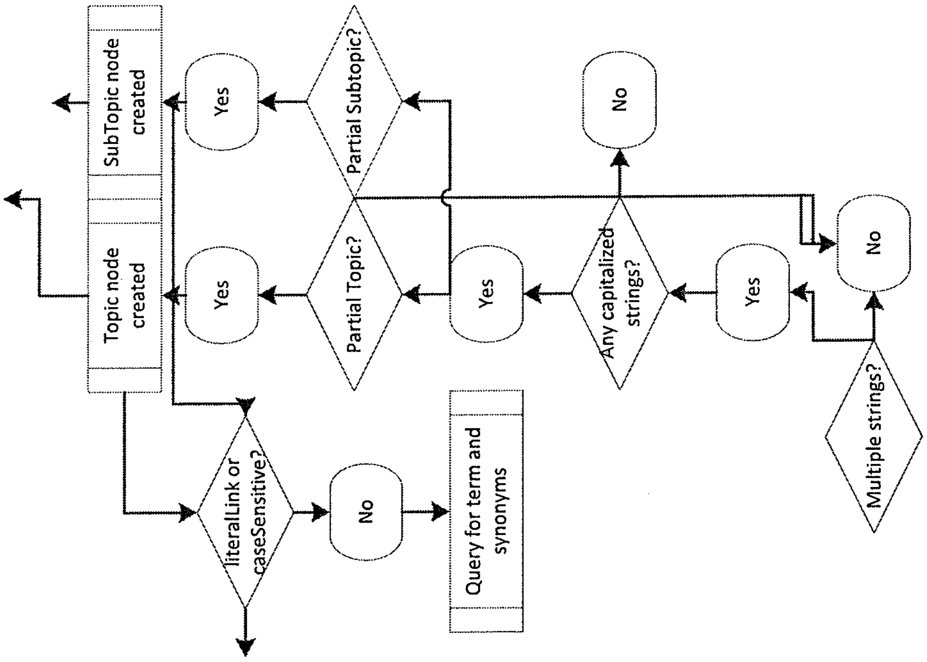

FIG. 9D illustrates a logical mapping of the process for formatting. The metadata tag "caseSensitive" determines whether only XML that is formatted identically will be identified as a topic or subTopic. Capitalized strings determine whether or not the format of the string will allow it to be used as either a topic or subTopic. Topics, subtopics and subtext all are capable of updating or creating a new region on the Scan-to-map system. The earlier matching process is determinative of most of the metadata that will be applied to formatting, with these noted exceptions. In a preferred embodiment, it is possible to define new rules that are driven by metadata. For now, the key is that the metadata is supported so that all parsing begins by seeking out and identifying all metadata contained as attributes within tags.

In the formatting process, if there is a set of matched data, that data will acquire any metadata and other data necessary to conform it to existing matched data. Formatting also includes placing data into the status of a subtopic. Formatting is the mechanism by which a map is created and/or updated. If matched data is a subtopic of some other data, then formatting will result in the matched data being tagged for inclusion under the existing topic.

In all aspects of the process, any matched data will require the addition of metadata that identifies one or more knowledge maps to which the matched data will be linked. If the matched data has no link, it will become its own knowledge map and will be formatted as such.

Figure 9E:
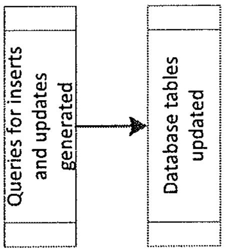

Once formatted, data then will be included in the storage subsystem 908 by a data processing algorithm. There are multiple database products, each of which include access methods supported by a plethora of programming languages and application-specific connectors. Formatted data is then stored pursuant to a storage algorithm that may include storage metadata. If metadata relates to the manner in which formatted data will be stored, this may alter how formatted data is in fact stored. For example, it could be that historical data should be stored and indexed in a manner that allows for rapid retrieval. Metadata could be provided that indicates that the formatted data should be indexed and cross-referenced for rapid later access. It might even include keywords that are added to separate tables within a database. FIG. 9E provides an overview of the two steps to a database commit. First, any queries are generated by the earlier steps shown in FIGS. 9A, 9B, 9C and 9D. Then those queries are run and all data is committed to the database shown in FIG. 9E for future retrieval and processing.

Figure 12:
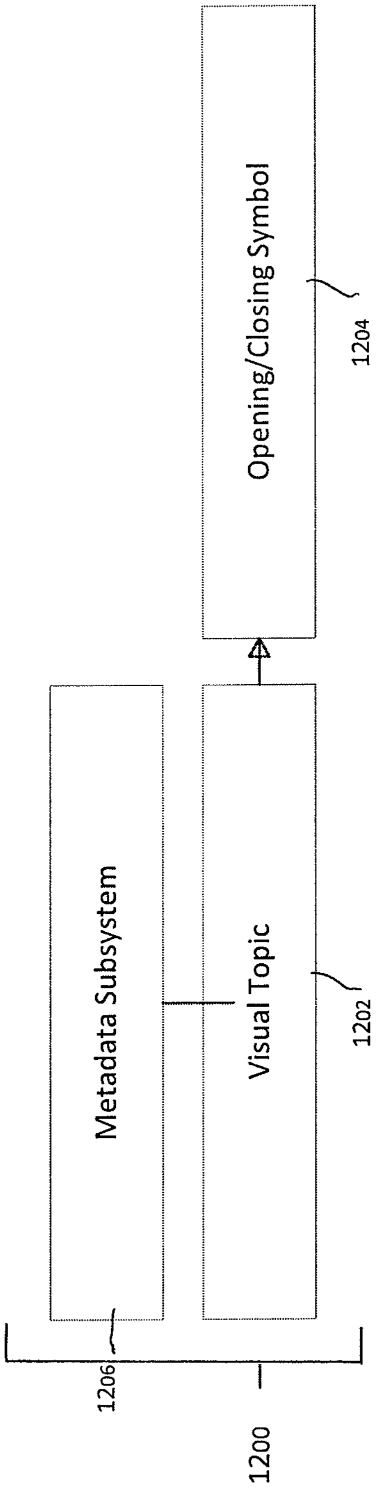
FIG. 12 is a schematic diagram of a Scan-to-Map visualization process.

FIG. 12 is a schematic diagram of the Scan-to-Map visualization process 1200. Within the visualization process are a series of visual topics 1202, methods 1204 of either opening or closing links to sub-topics and other materials, and a visual method 1206 of adding or updating metadata.

In any aspect of the present invention, the visual topic 1202 is presented through whatever supported codebase is used to display visual data, ranging from a compiled language such as C# and Java, or an interpreted language such as PHP or JavaScript. The visual topic may be an original topic or a linked subtopic and acts as a root element of the visualization of the knowledge map. The visual topic, as the base element, can be combined with multiple additional visual topics to form a map or a chain of topics and subtopics within a related chain.

Any visual topic may have an opening/closing symbol 1204. The purpose of the opening/closing symbol is to provide a rapid method of either revealing or concealing other visual content linked to the present visual topic. The symbol can be of any type, such as a visual plus and minus sign, some graphic, or any other visual method of revealing the ability to view or hide links among visual topics.

In a preferred embodiment, the metadata subsystem 1206 also has some type of visual element that can be used to hide or show options to add or update metadata. Within the metadata subsystem, many options are possible.

It is possible to allow metadata referring to any of the subsystems of FIG. 9. For example, one may choose to add a parsing reference that a visual topic is a subject reference that includes a predicate and should therefore not be parsed at all. Another example would be updating metadata to indicate that the present visual topic addresses an aspect such as "Why?" and can only be included in a knowledge map related to addressing the "Why?" of a topic or subtopic.

There are key technical advantages to the preferred embodiment of the present invention. First, through the use of automated subsystems, there are ways to automatically add and update relationships among topics within a knowledge map. Second, the visual system is designed for speed and ease-of-use. Speed and ease-of-use is an advantage of the system that will also provide an easier and more systematic search and matching result.

At present time, XML, or extensible markup language, is the most common method of providing a high-level ontology for data. Through the employment and development of XML as a language of exchange, the text becomes simple to interpret, as opposed to machine-language where such language is difficult for even the most well-trained professional to comprehend.

XML is limited in some senses as it would be slower than other methods for actually delivering text to the visual display. Text is very slow in retrieval because it takes time to parse and is often difficult to index effectively. Other schema may provide similar profit for the present invention and are welcome if they technically assist in the goal of quick topic definition or automatic topic processing.

The system is highly expandable. Modules may be added and other modifications made to leverage the ability to deliver knowledge maps. The preferred embodiment is compatible to some degree with knowledge mapping systems like MindManager, but is distinct and unique, as described herein.

The relations identified by the system include why, how, so, meaning and analogy. There is room for additional relations, too, as the taxonomy of relations is flexible. The system is flexible and adaptable.

The technical subsystems are amenable to a wide range of code languages. There are minimal restrictions, save that the user interface must be presentable in a web-browser in one aspect of the present invention. Also, as mobile technologies proliferate, adaptability to yet-to-be-developed technologies is understood. If a newer language or method of presenting information, such as virtual reality, develops into a solution that can provide support for the system, then such new technology is explicitly assumed to be compatible with the specifications of the present invention.

Each knowledge object is declared as a result of the use of the parsing subsystem 902 coupled with the interpretation of any applicable metadata. A knowledge object is extensible, and may or may not include a subject and a predicate, simply a subject, or any other arrangement of data as necessary to present the knowledge map.

Objects in the knowledge management world may consist of discrete data elements, such as a city name, or an array of elements, such as the 50 states or a token that represents an element, such as IA for Iowa, or 1 for Alaska. An object may be programmatically extendible or extendible through how it is linked with other objects. A root object has no object to link to that is closer to the root-level than the object.

An object can include an array that also includes sub-arrays. For example, an object might include three arrays, one with a sub-array of metadata settings, one with a sub-array of links and one with a sub-array of position information related to its visual location.

In object-oriented programming, there are different conceptualizations of objects. Strict object use in a compiled, strongly-typed programming language has a different denotation than is used here. The object concept referenced herein is more in line with the object as defined by both JavaScript and ActionScript, that is two languages which have top-level objects that are extensible in any manner by any type as part of their hierarchy.

Within the formatting subsystem, there is no specific requirement as to how elements must be linked. In one embodiment of the present invention, the links would work first with a root directory of knowledge maps, linked to subsidiary maps, further linked to listed topics within the maps, linked to subtopics, linked to sub-subtopics until the lowest level of relational hierarchy is reached. Any topic might be on multiple levels of different hierarchies. In fact, it is entirely possible that a hierarchy could be recursive or self-referencing. For example, a war could have a country that first aligned to one set of countries and then to another. So the country would need to reference both one side and then another in a conflict. If a user clicks to expand a link, they would need to reference two different sets of links. This could be accomplished through a recursive process or a remapping process that takes into account the original topic and sets either a default value or some other similar system of linking up information.

Information is often ambiguous and requires selecting manually among a range of options. Through the use of a flexible, adaptable option model, this goal may be attained programmatically using a wide range of languages and delivery systems targeting any type of computing device. Currently, devices range from mobile to desktop to laptop to server and may types of hybrids. The present invention does not rely on any specific platform for usage or distribution and is amenable to new types of technology, as long as they comply with the requirements outlined in FIG. 8.

Figure 13:
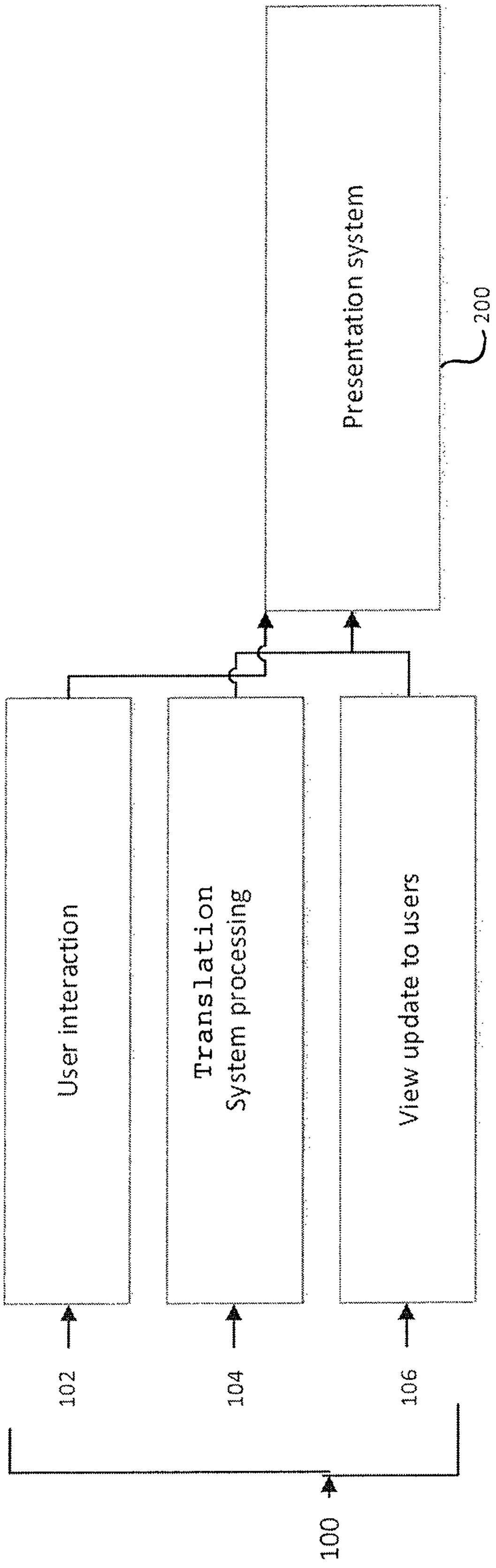
FIG. 13 is a schematic diagram illustrating a preferred modification to the method of the present invention in which subject and predicate labels are translated to preferred target language(s).

FIG. 13 is a schematic diagram illustrating a preferred modification to the method of the present invention in which a translation function 100 is used to translate subject and predicate labels are translated to preferred target language(s). First at input 102, a user elects to view information anywhere in the system, whether to interact with the system or to view user-generated content. The system then retrieves relevant information through the process of applying principles of relational ontology to the desired information input 104. In this process, standard translation algorithms are used and the information processing focuses on the nature of the information as opposed to the language of the information.

The presentation (map generation and display) system 200 determines whether additional target language(s) for display on the knowledge maps are being requested. There are several ways in which this might be derived. For instance, if the source material itself originated in a foreign language or if the user has demonstrated the usage of foreign languages in the past or if the user has selected one or more foreign languages as a preference for system usage. In other words, the translation function for other target languages is invoked if relevant to the search.

The system utilizes the most efficient algorithm available to translate the retrieved information 104 into one or more target languages. The translations themselves are stored in the system and associated to the sought content through a system of rules that apply to the source content as well as the translations. The translations may themselves be analyzed and broken down into fragments or subsets which are also stored for future retrieval. The Subject Field and other Predicate labels are used to assist the machine translation function with contextual or relatedness information to help resolve a semantically correct translation from among various homologous options.

For example, a user uploads text in French that includes the phrase "Vive la France!" The translation into English would be "Long live France!". For a user with no language preference, the original text "Vive la France!" would appear, but the system would automatically note the English preference and provide the translation as an alternate. The system utilizes an algorithm in this case which is provided by the stored language of the original text (French) coupled with the user preference (English), thus resulting in automated translation. Users might also denote that the preferred translation is "France forever" and, if enough users preferred this translation, it would be stored in its own right as the preferred translation. Appendix 2 provides an example of text entered in English and then translated.

The system first starts with the largest available contextual set of information. If a phrase is entered, the phrase is translated. If a page is entered, the content of the page is translated. Then the smallest discernible syntactic unit is derived and translated. Through gradual usage, the syntactic units are refined and all include associated counts.

Next, the system displays the sought information as an update to users 106 while the process of translation is taking place. Finally, the presentation system 200 displays both the sought information and the sought information in the relevant target language or target languages. The presentation system has the capability of adapting to multi-lingual usage in various contexts through the process of analysis. For example, a user searching on information about Don Quixote might also retrieve results in Spanish given that it is the language of the original text. This is as opposed to retrieval due to a stated preference. Also, if a majority of users happen to view the original text, it might also appear on this basis.

The user may tap, gesture, click or utilize any acceptable system action to replace text or augment text with translation material manually. The system would learn through preferences when to supply such information through an automated fashion, but would support any existing usage pattern.

As with the Scan-to-Map function, the subsystem relies on an automated, gradual process to increase accuracy and relevancy within translation. For example, if most users search upon or create content with the word "old"—"vieux" (French), "alt" (German) as opposed to "ancient" translated to "ancienne" (French) or "antiken" (German), then the system translation of "old" will likely result in "vieux" as the first choice and "ancienne" as the second, even though conventional translation preference order would be reversed.

An example of a server or PC-based machine translation system in multiple languages is commercially offered by SYSTRAN Translation, San Diego, Calif. The SYSTRAN machine translation engine combines the strengths of rule-based and statistical machine translation. An example of a Web-based machine translation system in multiple languages is offered by Babylon Ltd., Israel.

All translations are ultimately the production of an algorithm of approximation. The translation processing system using contextual or relatedness information of defined topics and subtopic labels in the knowledge mapping system allows for the leveraging of existing ontological paradigms to return an ultimately far more accurate translation for the user base.

Many other modifications and variations may of course be devised given the above description of the principles of the invention. It is intended that all such modifications and variations be considered as within the spirit and scope of this invention, as defined in the following claims.

The invention claimed is:

1. A method for relational analysis of input items of information, each having a title, header or subject line and content to which it refers, said method to be performed on a computer system operable with a visual mapping software program for creating a visual map of input items of knowledge information related to a given theme and to each other as topics and subtopics in order to create a visual map of knowledge information of the given theme, said computer system including a storage repository for storing information content related to the given theme for topic and subtopics referenced on the visual map of knowledge information, said method comprising:

a) parsing a title, header, or subject line for an input item of information into syntactical components of at least a subject component and any predicate component syntactically related thereto;

b) determining the subject component as a topic and any predicate component as a subtopic relationally linked thereto;

c) searching a topic-subtopic index of the knowledge information map for any existing topics or subtopics created therein for a match to said subject component syntactically parsed from the input item of information;

d) if a match to an existing topic or subtopic is found, then formatting said subject component to be displayed the same as the existing topic or subtopic, and if no match is found, then formatting said subject component to be displayed as a new topic in the existing knowledge information map, and also formatting said predicate component to be displayed as a subtopic of the displayed topic, wherein in said searching for match step, if there is a match of a subject component at a topic level, then it is subsumed under the existing topic and its predicate component is added as a linked subtopic if no subtopic match is found, and a new subject component is added as a topic if its associated predicate component matches an existing subtopic, and wherein a translation function of the computer system for translating topics and subtopics from an original language into one or more target languages is enabled by user request or indicated user preference for display on a generated visual map of knowledge information.

2. A method according to claim 1, wherein the translation function uses contextual or relatedness information indicated by the topics and subtopics in their original language to help resolve semantically correct translation into the target language(s).

3. A method according to claim 1, further comprising:

a) searching the index of the existing knowledge information map and existing subtopics created therein for a match to said predicate component syntactically parsed from the input item of information; and b) if a match to an existing subtopic is found, then formatting said predicate component to be the same as the existing subtopic, and if no match is found, then formatting said predicate component as a new subtopic in the existing knowledge information map.

4. A method according to claim 1, further comprising storing topic-related information content of the input item of information in the storage repository of the computer system referenced to its formatted topic on the visual map of knowledge information.

5. A method according to claim 1, wherein the parsed input components are checked against a hierarchy of indices in the following order:

a) root directory of knowledge maps, with links to listed subsidiary maps;

b) specific knowledge map with name of subject, with links to listed topics;

c) specific topics with name of subject, with links to listed subtopics; and d) specific subtopics with name of subject, with links to listed sub-subtopics.

6. A method according to claim 1, wherein a knowledge map is created and maintained for an educational subject for teaching on a stand-alone computer connected to an online network as a medium for online instruction in the educational subject, wherein a plurality of knowledge maps are aggregated and organized in an ordered course of instruction, and wherein the ordered course of instruction is managed by a course management system.

7. A method according to claim 6, wherein the course management system includes one or more functional components from the group consisting of: a) lesson section which contain respective knowledge maps for instruction; b) discussion and analysis workspace related to the knowledge maps; c) an Announcements forum; d) a Course Calendar; e) a Collaboration workspace; f) a Course Roster; g) a mail section for communication among users; and h) course information section.

8. A method according to claim 6, wherein the course management system includes a Comprehensive Assessment Profile (CAP) section to generate and maintain records of assessment scores and overall learner progress.

9. A method according to claim 6, wherein the course management system includes multimedia knowledge objects with links to information content such as websites, bibliographies, articles and books, primary sources, films and videos, symphonies and other audio files, interactive maps, museum exhibits, and online lectures.

10. A method according to claim 8, wherein the Comprehensive Assessment Profile (CAP) section includes assessments that are coordinated with knowledge maps used for instruction and used to objectively measure a learner's progress via an online report card.

11. A method according to claim 1, wherein said parsing of a title, header, or subject line for an input item of information includes deconstructing a sentence or phrase of scanned text and identifying its syntactical elements using phrase-structure rules to break down a natural language sentence or phrase into constituent elements, and tagging the constituent elements as corresponding knowledge map schema to be displayed as analogous parent/offspring knowledge objects in the knowledge map.

12. A method according to claim 11, wherein the knowledge map schema include those corresponding to a semantic function of the group consisting of: "Why", "How", "So", "Meaning", "Analogy", and "Concept".

13. A method according to claim 12, wherein the semantic function of a sentence element is determined according to one or more grammatical rules of the group consisting of: (a) the order in which the sentence element appears; (b) the structure in which it occurs; (c) the type of meaning it expresses; (d) the type of affixes it takes; (e) Boolean predicates that the content must satisfy; (f) data types governing the content of elements and attributes, and (g) more specialized rules such as uniqueness and referential integrity constraints.

14. A method according to claim 1, wherein the parsed input includes metadata associated with a non-metadata entry, and the metadata are parsed as an instruction to override parsing rules and determine subject and predicate components for the associated non-metadata entry.

* * * * *